(Model.)

J. H. RUDY.

MILK COOLER.

No. 265,282. Patented Oct. 3, 1882.

WITNESSES

Fred. G. Dieterich.
F. L. Dieterich.

INVENTOR
John H. Rudy,
by C. A. Snow & Co.
Attorneys

N. PETERS. Photo-Lithographer. Washington, D. C.

UNITED STATES PATENT OFFICE.

JOHN H. RUDY, OF HARRISBURG, PENNSYLVANIA.

MILK-COOLER.

SPECIFICATION forming part of Letters Patent No. 265,282, dated October 3, 1882.

Application filed February 1, 1882. (Model.)

*To all whom it may concern:*

Be it known that I, JOHN H. RUDY, of Harrisburg, in the county of Dauphin and State of Pennsylvania, have invented certain new and useful Improvements in Milk-Coolers; and I do hereby declare that the following is a full, clear, and exact description of the invention, which will enable others skilled in the art to which it appertains to make and use the same, reference being had to the accompanying drawings, which form a part of this specification.

Figure 1:
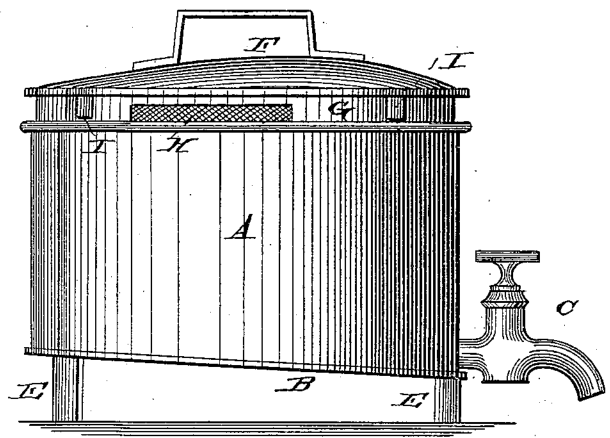
Figure 2:
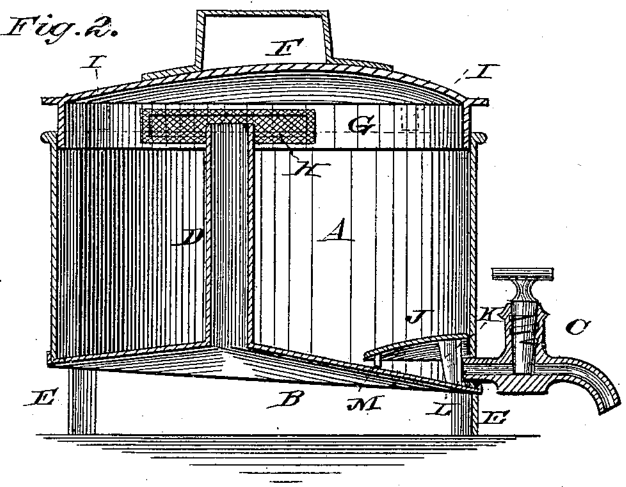
Figure 3:
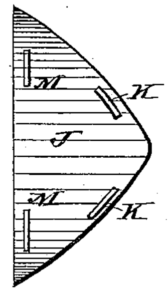

Figure 1 is a side view of my improved milk-cooler. Fig. 2 is a longitudinal vertical sectional view, and Fig. 3 is a detail view of the shield or separator.

Corresponding parts in the several figures are denoted by like letters of reference.

This invention relates to milk-coolers; and it consists in certain improvements in the construction of the same, which will be hereinafter fully described, and particularly pointed out in the claim.

In the drawings hereto annexed, A represents the body of my improved milk-cooler, which consists of a suitably-shaped vessel, the bottom of which, B, is inclined down toward the front, where the vessel is provided with a faucet, C. The bottom B is convex upon its upper side, as clearly shown in Fig. 2 of the drawings, and it is provided at its highest point with an upward-projecting tube, D, extending above the sides of the vessel. The latter may be supported upon suitable legs, E.

F is a cover, which is provided with a rim, G, fitting in the vessel A. Said rim is provided with openings H, covered with gauze or wire-netting for ventilating purposes. The rim G is provided with stops I, by which the cover rests upon the upper edge of the vessel A in such a manner as to keep the ventilating-openings exposed. By this arrangement dirt and dust are effectually excluded, and the contents of the can or vessel at the same time freely ventilated.

J is a shield or plate, of sheet-metal or other suitable material, of a suitable shape to fit over the front end of the bottom B of vessel A, where it is supported upon legs K, so as to cover the spigot-opening L. The rear end of shield J is slightly raised from the inclined bottom—say one-sixteenth of an inch—by short legs M.

The operation of my invention will be readily understood. The can or vessel containing milk may be set in or surrounded by constantly-changing cool water, which serves to reduce the temperature, and assists the cream in forming. Owing to the convex bottom the body of milk at the center of the can or vessel is reduced in volume and evenly exposed with that at the sides to the cooling action of the water in which the can is placed. When the cream has formed the milk is drawn off through the spigot C, leaving the cream in the can, from which it may be conveniently removed. Owing to the construction and arrangement of the shield or separator J the milk is drawn off evenly from all parts of the can without disturbing the cream.

Having thus described my invention, I claim and desire to secure by Letters Patent of the United States—

The can or vessel A, having inclined convex bottom B and spigot C, in combination with the shield or separator J, having legs K M, substantially as set forth.

In testimony that I claim the foregoing as my own I have hereto affixed my signature in presence of two witnesses.

JOHN H. RUDY.

Witnesses:
JNO. M. MAJOR,
LOUIS STERNS.